United States Patent
Hypke et al.

(10) Patent No.: US 6,784,803 B1
(45) Date of Patent: Aug. 31, 2004

(54) APPARATUS AND METHODS FOR MONITORING AND DETECTING SEAT BELT USAGE

(75) Inventors: George E. Hypke, Glenarm, IL (US); Robert R. Walker, Rushville, IL (US)

(73) Assignee: Seatbelt Safety First--LLC, Glenarm, IL (US)

( * ) Notice: Subject to any disclaimer, the term of this patent is extended or adjusted under 35 U.S.C. 154(b) by 30 days.

(21) Appl. No.: 10/224,181

(22) Filed: Aug. 20, 2002

Related U.S. Application Data

(60) Provisional application No. 60/314,077, filed on Aug. 23, 2001.

(51) Int. Cl.[7] .............................................. G08B 21/00
(52) U.S. Cl. ..................... 340/687; 340/667; 340/691.6; 340/539.1; 340/825.69; 340/825.72; 340/426.13; 340/457.1; 180/271; 180/273
(58) Field of Search ................................. 340/687, 667, 340/691.6, 539.1, 825.69, 825.72, 426.13, 457.1; 180/271, 273

(56) References Cited

U.S. PATENT DOCUMENTS

| | | | |
|---|---|---|---|
| 5,490,286 A | * 2/1996 | Kah, Jr. ...................... 455/502 |
| 5,883,441 A | 3/1999 | Shoemaker ................. 307/10.1 |
| 5,973,611 A | * 10/1999 | Kulha et al. ................ 340/5.62 |
| 6,006,212 A | * 12/1999 | Schleich et al. ............. 705/412 |
| 6,025,783 A | * 2/2000 | Steffens, Jr. ................ 340/644 |
| 6,059,066 A | 5/2000 | Lary ........................... 180/268 |
| 6,215,395 B1 | 4/2001 | Slaughter et al. ......... 340/457.1 |
| 6,408,232 B1 | * 6/2002 | Cannon et al. .............. 701/29 |
| 6,476,517 B1 | * 11/2002 | Okada ........................ 307/10.2 |

\* cited by examiner

*Primary Examiner*—Daniel J. Wu
*Assistant Examiner*—Tai T. Nguyen
(74) *Attorney, Agent, or Firm*—Husch & Eppenberger, LLC; Robert C. Haldiman; David A. Chambers

(57) ABSTRACT

Apparatuses and methods for monitoring and detecting seat belt usage, having an enforcement device with an enforcement circuit board and a vehicle device with a vehicle circuit board. Each of the enforcement circuit board and the vehicle circuit board has a transformer and a receiver and a pair of antennas for transmitting and receiving a first signal and a return signal. The enforcement device and the vehicle device communicate a properly fastened state or an improperly fastened state for a seat belt.

28 Claims, 8 Drawing Sheets

Fig. 3.

RECEIVER

| Designation | Function | P/N |
|---|---|---|
| REC | 8 Ch. Data Receiver | RXD – 418 – KH |
| Q1 & Q2 | Buffers (and gates) | 74LS08 |
| Q4 | Inverters (Polarity Changer) | 74HC04 |
| Q5 | Decoder (Binary to BCD) | 74HC139 |
| Q6 | Decoder Switches (Nor Gates) | 74HC139 |
| Q7 – Q10 | Display Driver/ Latches | L74HC4511 |
| Q3 | Latch (Yes/ No Decision) | 74HC74 |

TRANSMIT

| Designation | Function | P/N |
|---|---|---|
| Q11 | One Shot Transmit Enable | NE 555 |
| TR | Transmitter | TXE – 418 – KH |

Fig_6_

RECEIVER

| Description | Function | P/N |
|---|---|---|
| REC | Receiver | RXD – 418 – KH |
| Q1 – 2 | Buffers VT Signal & Trigger 1-Shot | 74LS08 (1/4) |

TRANSMIT

| Description | Function | P/N |
|---|---|---|
| Q2 | 1 - Shot Time Delay | NE 555 |
| Q3 | System Clock (100 HZ) | NE 555 |
| Q1 – 2 | And gate, add 1-shot & clock drive binary counter | 74LS08 (1/4) |
| Q4 | Binary Counter generates 00, 01, 10, 11 code | 74HC107 |
| Q5 & Q6 | Multiplexers, convert 4 switch codes to serial data | 74HC153 |
| Q1 – 3 | Seat belt switch buffer | 74LS08 1/4 |

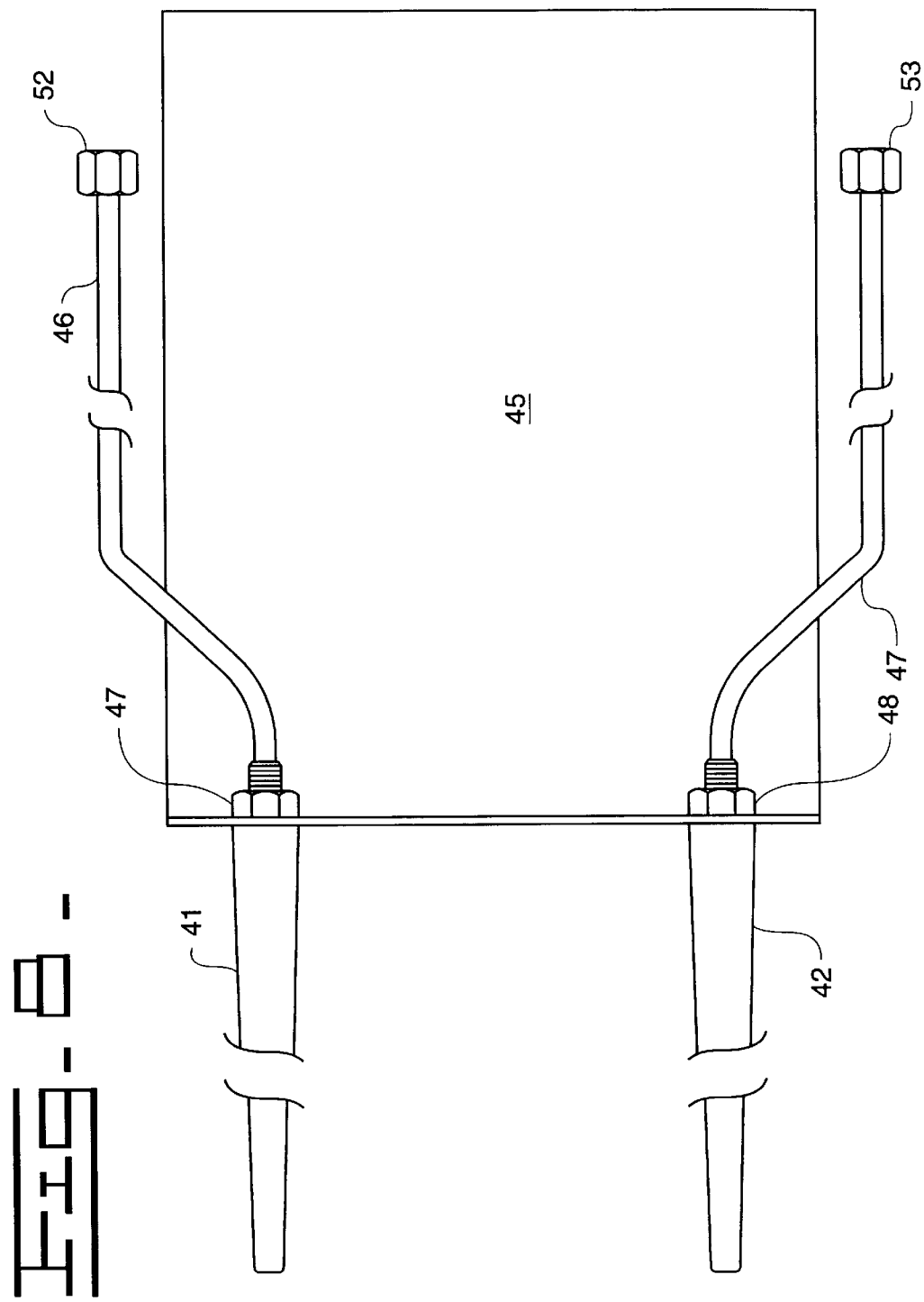

APPARATUS AND METHODS FOR MONITORING AND DETECTING SEAT BELT USAGE

CROSS REFERENCE TO RELATED APPLICATIONS

This application claims priority of prior Provisional Application No. 60/314,077, filed Aug. 23, 2001.

TECHNICAL FIELD OF THE INVENTION

The present invention relates to vehicle safety and, more specifically, apparatuses and methods for monitoring and detecting seat belt usage.

DESCRIPTION OF THE RELATED ART

Many states now have mandatory seat belt laws, but enforcement of seat belt laws has been ineffective. Enforcement of seat belt laws has been performed predominantly by visual detection by police personnel or by admission of violators. Obviously, visual detection from a distance becomes almost impossible and too subjective. Even at close distances, visual detection is subjective and prone to challenge in a court of law. Furthermore in inclement weather or under the cover of darkness, visual detection is nearly impossible. In contrast, radar guns that are used to detect vehicles traveling at excessive speeds and above the speed limit are reliable and not as prone to challenges in court. To date, detection devices, similar to radar guns, are not available for detecting seat belt usage.

Numerous sources indicate that seat belt usage is the single most effective piece of safety gear in vehicles. Auto industry employees, law enforcement personnel, the United States Department of Transportation (hereinafter "USDOT"), the Federal Highway and National Highway Transportation and Safety Administration (hereinafter "NHTSA") have emphasized that the use of seat belts remain the single most important safety factor for saving lives in a crash. The USDOT, Federal Highway and NHTSA have indicated that the largest single issue with them is preventing injuries, saving lives and saving money via seat belt usage. The USDOT and/or NHTSA have reported that "[s]afety belts, when used, reduce the risk of fatal injury to front-seat passenger car occupants by 45 percent. Recent NHTSA analyses indicate an overall fatality-reducing effectiveness for air bags of 12 percent." In DOT HS 809 327 Traffic Safety Facts 2000 Occupant Protection, it indicates that seat belts are three and one-half times more effective than air bags in reducing fatal injuries. In DOT HS 809 349 November 2001, Norman Mineta, United States Secretary of Transportation, emphatically summarized the above in his Fourth Report to Congress, dated November 2001, "[n]o other transportation initiative has greater potential for reducing deaths and injuries of Americans of all ages and races, which is why the Buckle Up America Campaign is so very, very important."

In TEA 21 Grants Information, NHTSA has printed and released information that indicates that for an average of one to four percentage points increase in seat belt usage rates, 232 to 940 lives would be saved annually; 5,700 to 23,000 non-fatal injuries would be prevented; and $64 million to $258 million in medical costs would be reduced. Significantly, this is for a nominal increase in percentage of seat belt usage, or specifically from one to four percentage points. In TEA 21 Grant Information, it was reported that a study conducted by NHTSA revealed that the average in-patient cost for crash victims, who were not using seat belts, was 55 percent higher than for those who used their seat belts.

To further illustrate the significance of the staggering potential for improvement with seat belt usage, Norman Mineta reported in his Fourth Report to Congress, see TEA 21 Grants Information, that "[t]he average inpatient hospital charges for an unbelted driver exceed the inpatient, hospital charges of a belted driver by $5,000. The National Highway Traffic Safety Administration (NHTSA) estimates that if the seat belt use rate for front seat passengers in automobiles and light trucks increased to 90 percent, Medicare and Medicaid alone would save $356 million each year. If the national seat belt use rate increased from 68 percent to 90 percent, over 5,500 additional lives would be saved and over 132,000 injuries would be prevented each year, resulting in an economic savings of about $8.8 billion annually."

Newspaper articles throughout the country regularly report tragic accidents resulting in serious injury and death that occur could have been prevented if the occupant(s) had been wearing a seat belt. The State Journal Register, Springfield, Ill., dated Jan. 1, 2002 reported a fatal crash that took the lives of two Riverton High School teenage youths, and specifically pointed out that they weren't wearing seat belts. In the same newspaper dated Feb. 15, 2002, it was reported that a young, twenty-five year old professional baseball player, in only his second year of major league baseball, was tragically killed along with his twenty-three year old friend. A third occupant in the car was the only one out of the three that was wearing a seat belt and the only one that lived. During the accident, the other two occupants were ejected from the vehicle and died.

These examples are a mere sample and consistent with statistics that are provided by the NHTSA. In TEA 21 Grants Information, it was reported that "[i]n fatal crashes, 75 percent of passenger car occupants who were totally ejected from the vehicle were killed. Safety belts are effective in preventing total ejections: only 1 percent of the occupants reported to have been using restraints were totally ejected, compared with 22 percent of the unrestrained occupants."

In an Associated Press release, dated Feb. 28, 2002, an article appeared in the Springfield, Illinois State Journal Register titled, "Government backs away from 'unrealistic' seat belt use goal." Jeffrey Runge, head of the NHTSA, told a Senate Appropriations panel, in summarization, that seat belt usage has not met standards set by the previous Presidential Administration. Mr. Runge's suggestion was to set more realistic goals. The decision was criticized by Senator Patty Murray, who leads the transportation subcommittee, for setting lower expectations. "I believe in realistic goals, but I also believe when you lower your goal like that you send a very bad message, Murray, D-Wash., told Runge."

It has been expressed that the best way to increase seat belt usage rates by any significant levels is by further innovative techniques. In further published information released by USDOT—NHTSA on a Web site dated June 2001, it was reported that a key to obtaining higher seat belt usage rates is to have a law enforcement centerpiece for better enforcement. In DOT HS 809 291, dated June 2001, it was reported that "[a] high profile enforcement effort is one of the best ways to increase seat belt use. No other intervention—except for passage of the law itself— consistently shows equally powerful results." Further, the reason these efforts usually work is simple: "if people perceive they are likely to get a ticket for not wearing a seat belt, they are much more likely to buckle up. Safety advocates have a powerful new weapon in their arsenal—law enforcement's ability to pull over a motorist simply for violating the seat belt law. Yet, the power behind the law is not so much in the action itself, it is in how a standard enforcement law can increase a person's perceived risk of being pulled over for not being buckled up." The statements on this Web site, in part, are describing the advocacy of a primary enforcement law where a state has a law that a person can be pulled over simply for violating the seat belt law, as opposed to what is called secondary enforcement law states where an enforcement officer has to have another reason for pulling a person over before being allowed to write a citation for a seat belt violation. However, it still remains that police or law enforcement officials do not have monitoring or detection devices for seat belt violations. This would lead to the prior mentioned actions of motorist's perception that they are more likely to get pulled over and ticketed for not using a seat belt. The power of a new enforcement effort in this manner would not be so much in the action itself, but in how that action would increase a person's perceived risk of being pulled over for not wearing a seat belt and thus would cause seat belt usage rates in and of itself to go up. It is estimated that this alone could increase the seat belt usage by as much as 5 to 10 percent.

U.S. Pat. No. 6,059,066 provides a great deal of information on seat belt devices that have been implemented recently. Most of these devices have been of the passive reminder variety to remind vehicle occupants that they do not have their seat belt on. Other more aggressive attempts have been made to get occupants to wear their seat belts, such as devices that do not allow the vehicle to start unless the occupants have their seat belts on. Some of these attempts and devices have been viewed as obtrusive on the driver or even life endangering in the case of certain emergencies. While some of these devices are helpful in getting some occupants to use seat belts, additional devices or methods are needed to encourage die-hard non-wearers to use their seat belt.

U.S. Pat. No. 6,059,066 takes a step in the direction of surveillance. However, the system lends itself to strong self-incrimination by illuminating lights that represent a vehicle occupant is not wearing his or her seat belt. Moreover, since seat belt use is not mandated in all states, this system may be unacceptable in some states. Also, this system will change the outside appearance of vehicles and may be unacceptable to automobile manufacturers in the presentation of its product to the buying consumer. Further, the public's opinion weighs toward privacy in this touchy and sensitive, yet important, issue. It would be more acceptable from a privacy standpoint to allow only law enforcement personnel to monitor the use or non-use of seat belt laws.

It is apparent that a low cost and effective method and device to encourage individuals to wear seat belts is needed. Moreover, a method and device that only allows law enforcement personnel to monitor, enforce and apply the seat belt laws of various states is needed. Also, a method and device that is unobtrusive on the appearance of a vehicle is needed to facilitate acceptance by automobile manufacturers and the buying public.

The present invention is directed to overcome one or more of the problems and disadvantages as set forth above.

SUMMARY OF THE INVENTION

An aspect of the present invention is to provide apparatuses and methods for overcoming one or more of the problems and disadvantages set forth above.

In another aspect of the invention, there are methods and apparatuses for monitoring and detecting seat belt usage or lack thereof.

In yet another aspect of the invention, there is an electronic device having an enforcement device and vehicle device including transmitters and receivers for use in monitoring and detecting seat belt usage.

In still another aspect of the invention, there is an electronic vehicle devices installed in vehicles for receiving and transmitting signals for use in monitoring and detecting seat belt usage.

The above aspects are merely illustrative and should not be construed as all-inclusive and limiting to the scope of the invention. The aspects and advantages of the present invention will become apparent, as it becomes better understood from the following detailed description when taken in conjunction with the accompanying drawings.

BRIEF DESCRIPTION OF THE DRAWINGS

Reference is now made more particularly to the drawings, which illustrate the best presently known mode of carrying out the invention and wherein similar reference characters indicate the same parts throughout the views.

FIG. 3 is a table of electrical components used in the circuit board for the enforcement device;

FIG. 8 is top view of an antenna assembly for the vehicle device.

DETAILED DESCRIPTION

Figure 1:
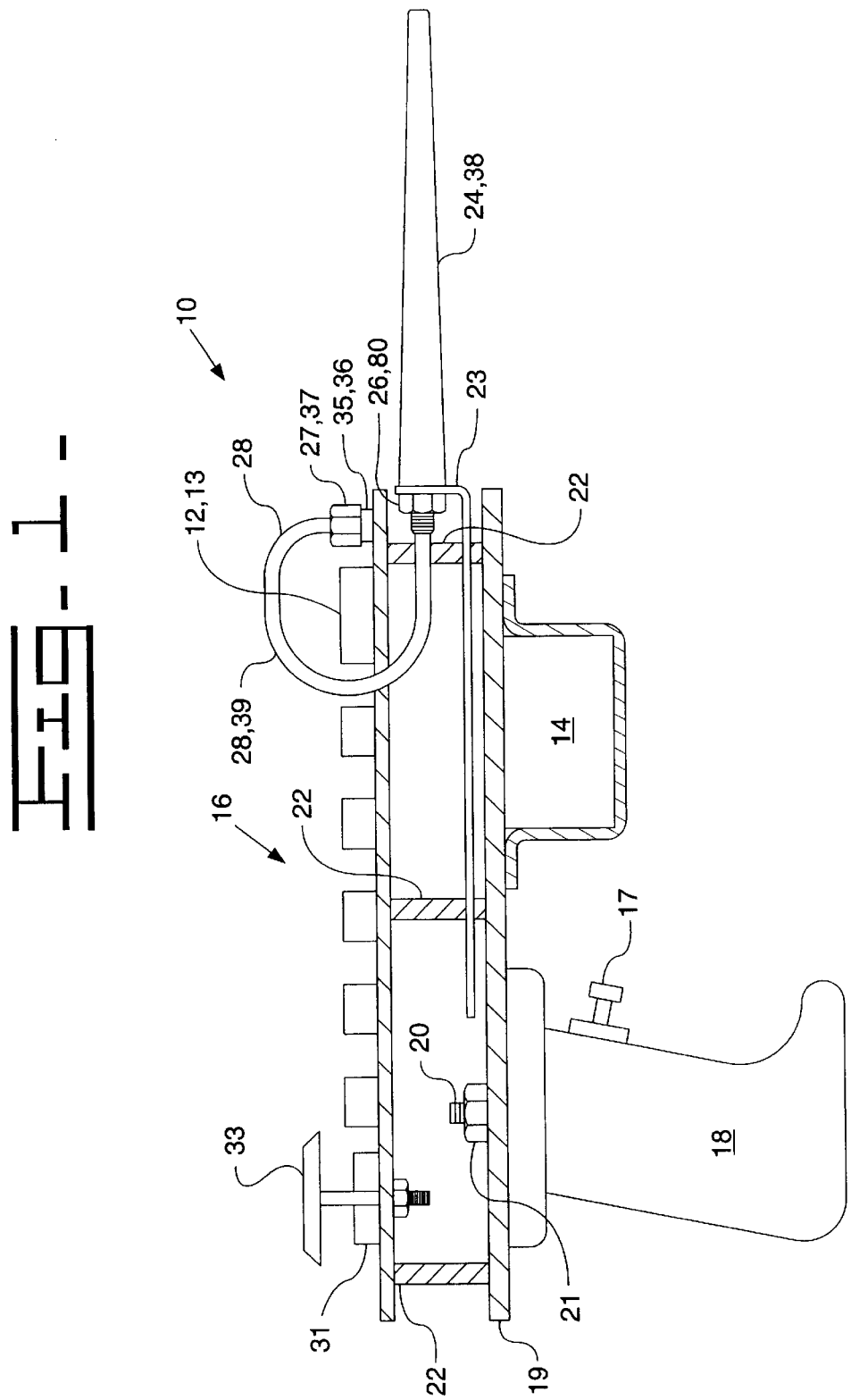
FIG. 1 is a side view of an enforcement device according to the invention.

It is to be understood that while a certain embodiment of the invention is illustrated, it is not to be limited to the specific embodiment or arrangement herein described and shown. It will be apparent to those skilled in the art that various changes may be made without departing from the scope of the invention and the invention is not to be considered limited to what is shown in the drawings and described in the specification.

FIGS. 1–4 show an enforcement device 10 for detecting seat belt usage in vehicles equipped with a vehicle device 11. The enforcement device 10 has an enforcement printed circuit board 16 including a transmitter 12 and a receiver 13 for transmitting and receiving a signal to and from the vehicle device 11, respectively. The transmitter 12 is preferably a Transmitter, part number TXE-418-KH sold by Linx Technologies having an office at 575 S.E. Ashley Place, Grants Pass, Oreg., 97526. The receiver 13, is preferably, an eight channel data receiver, part number RXD-418-KH sold by Linx Technologies having an office at 575 S.E. Ashley Place, Grants Pass, Oreg., 97526. Voltage regulators 35, 36 are electrically connected to and recommended by the manufacturers of the transmitter 12 and the receiver 13, respectively. The voltage regulator 35 is a 5 VDC voltage regulator and is electrically connected to the transmitter 12. The voltage regulator 36 is a 3.3 VDC voltage regulator and is electrically connected to the receiver 13. The enforcement device 10 is battery powered by a 12 VDC battery 14. A charger jack 34 is electrically connected to and used for charging the battery 14.

Figure 2:
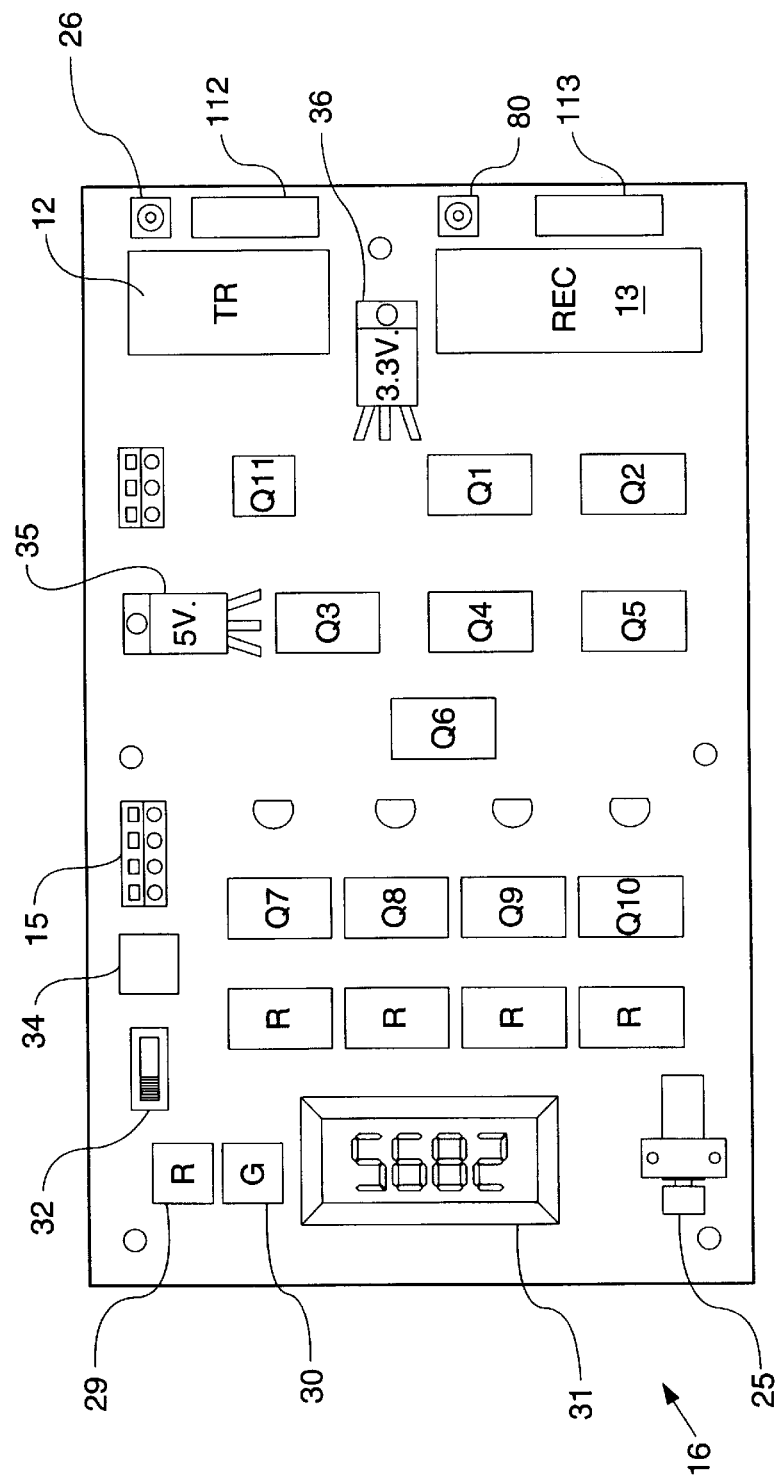
FIG. 2 is a top view of a circuit board for the enforcement device according to FIG. 1.

Referring to FIGS. 1 and 2, the battery 14 supplies power to the enforcement circuit board 16 of the enforcement device 10 via a battery connection 15. Once the power is supplied to the enforcement circuit board 16, a trigger 17 is used to transmit a signal to the vehicle device 11. The trigger 17 is mounted to a handle 18 of the enforcement device 10. The handle 18 is mounted transverse to an insulator 19 via a screw 20 and bolt 21. Spacers 22 are mounted between the insulator 19 and the enforcement circuit board 16. An antenna ground plane 23 is intermediate to the insulator 19 and the enforcement circuit board 16. The antenna ground plane 23 provides a ground for enforcement antennas 24, 38. The enforcement antennas 24, 38 are, preferably, 418 mega-Hertz (MHz) antennas and are mounted to the enforcement ground plane 23 and extend in the horizontal plane and transverse to the handle 18. When a user is holding the handle 18, the enforcement antennas 24, 38 are pointed toward the desired target (i.e., a vehicle). The enforcement antennas 24, 38 have enforcement antenna wires 28, 39 and are connected to the enforcement ground plane 23 via antenna connectors 26, 80, respectively. The enforcement antenna wires 28, 39 have distal ends having second connectors 27, 37 for connecting the enforcement antenna wires 28, 39 to the transmitter 12 and the receiver 13, respectively, of the enforcement circuit board 16. The second connectors 27, 37 are, preferably, SMA connectors and mate with enforcement board connectors 35, 36. The enforcement antenna 24 is operatively, electrically connected to the transmitter 12, and the enforcement antenna 38 is operatively, electrically connected to the receiver 13. The enforcement antennas 24, 38 are used to transmit and receive signals from the vehicle device 11.

The transmitter 12 on the enforcement printed circuit board 16 is coded with an enforcement transmit code. In the preferred embodiment, there is an enforcement transmit code device 112 for encoding the transmitter 12 of the enforcement printed circuit board 16. The receiver 44 on the vehicle printed circuit board 40 is coded with a vehicle receiver code that is identical to the enforcement transmit code. In the preferred embodiment, there is an vehicle receiver code device 144 for encoding the receiver 44 of the vehicle printed circuit board 40 with the identical enforcement transmit code as that of the enforcement printed circuit board 16. In that way, the communication between the transmitter 12 and the receiver 40 is impervious to outside noise and interference.

The transmitter 43 on the vehicle printed circuit board 40 is coded with an vehicle transmit code. In the preferred embodiment, there is a vehicle transmit code device 143 for encoding the transmitter 43 of the vehicle printed circuit board 40. The receiver 13 on the enforcement printed circuit board 16 is coded with an enforcement receiver code that is identical to the vehicle transmit code. In the preferred embodiment, there is an enforcement receiver code device 113 for encoding the receiver 13 of the enforcement printed circuit board 16 with the identical vehicle transmit code as that of the vehicle printed circuit board 16. In that way, the communication between the transmitter 43 and the receiver 13 is impervious to outside noise and interference. The address for the transmitter 12 of the enforcement printed circuit board 16 and the receiver 44 of the vehicle printed circuit board 40 is different from the address for the transmitter 43 of the vehicle printed circuit board 40 and the receiver 13 of the enforcement printed circuit board 16.

Figure 4:
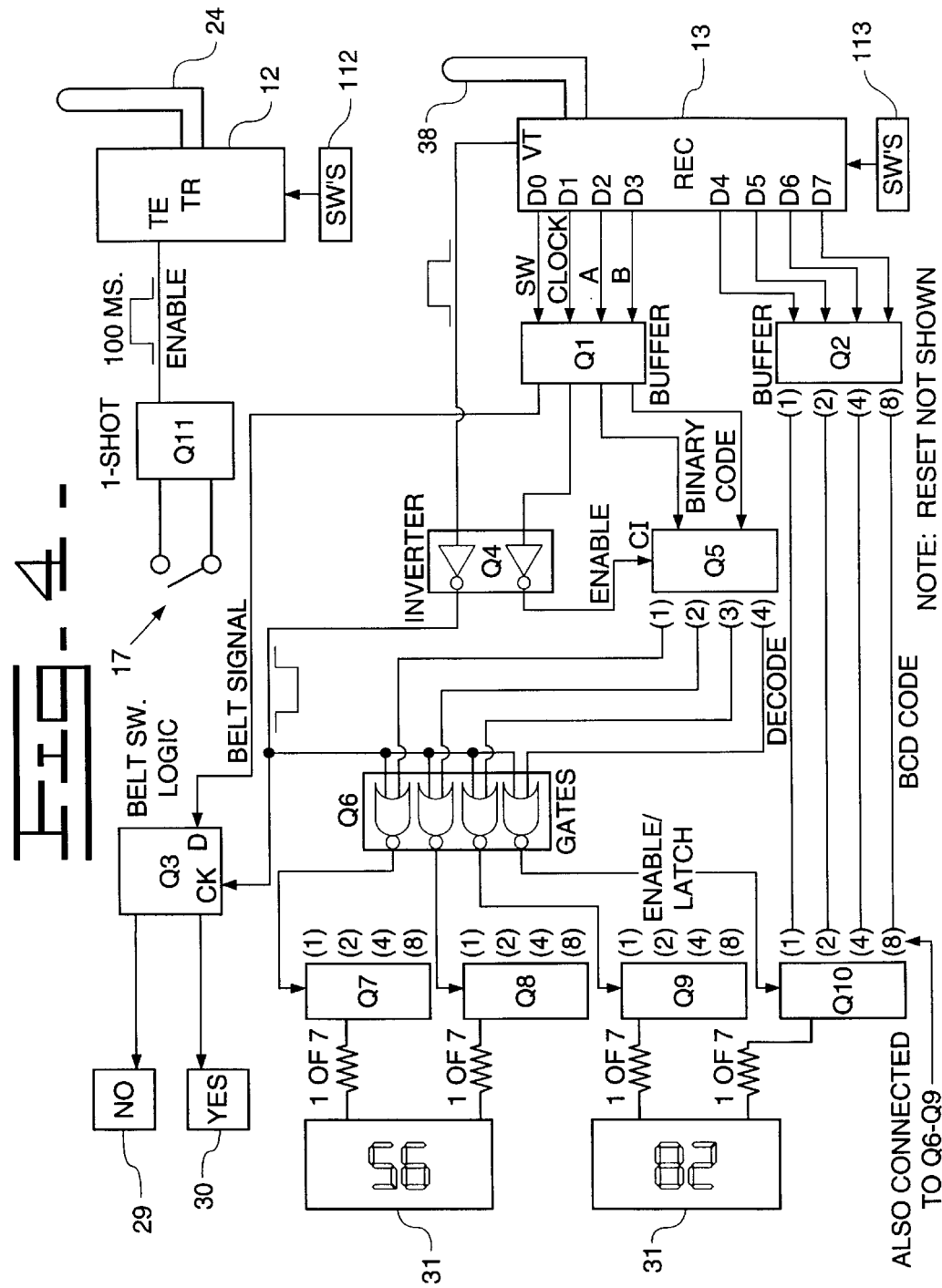
FIG. 4 is an electrical schematic of the enforcement device.
Figure 5:
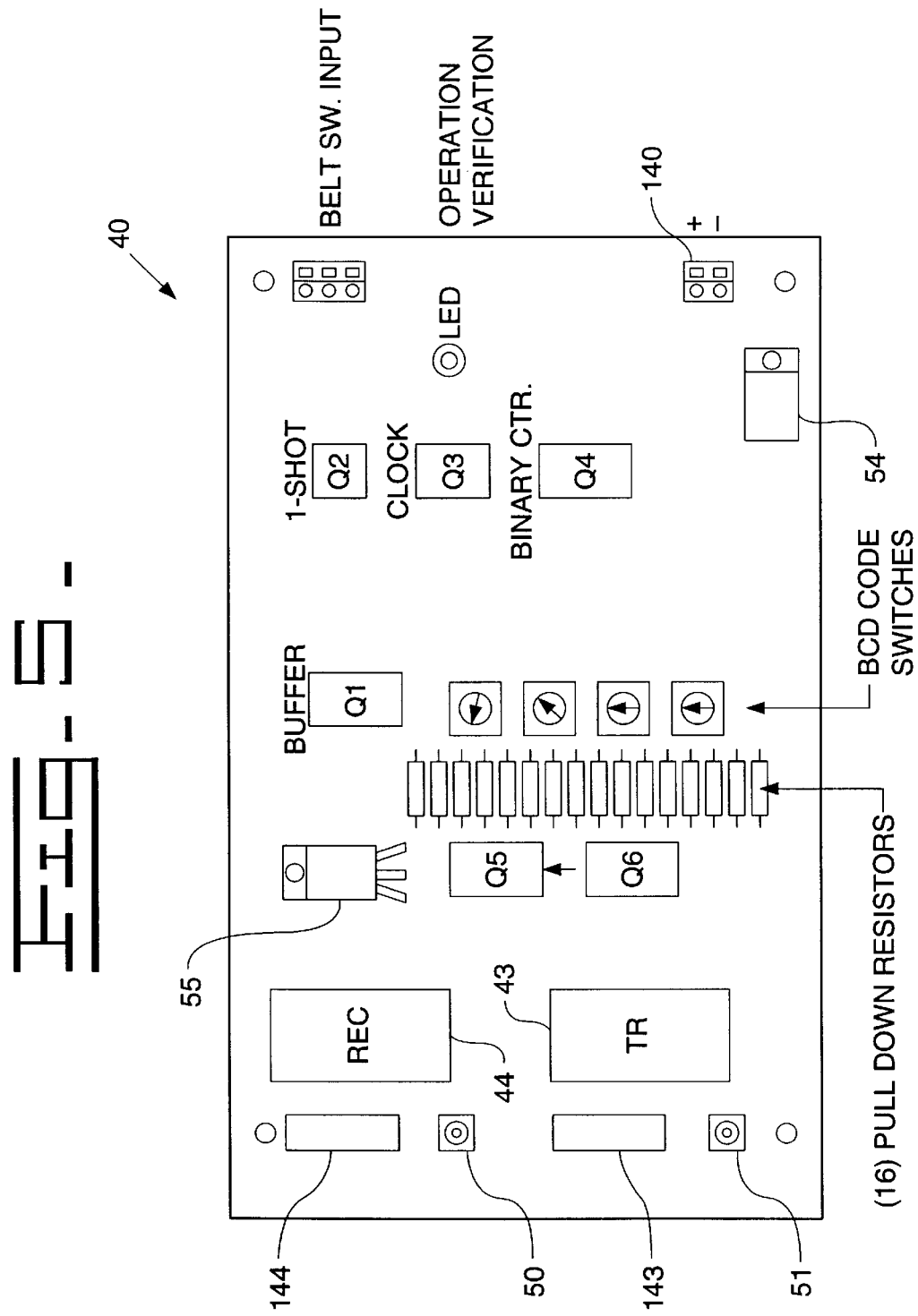
FIG. 5 is a top view of a circuit board for a vehicle device.
Figure 6:
FIG. 6 is a table of electrical components used in the circuit board for the vehicle device.
Figure 7:
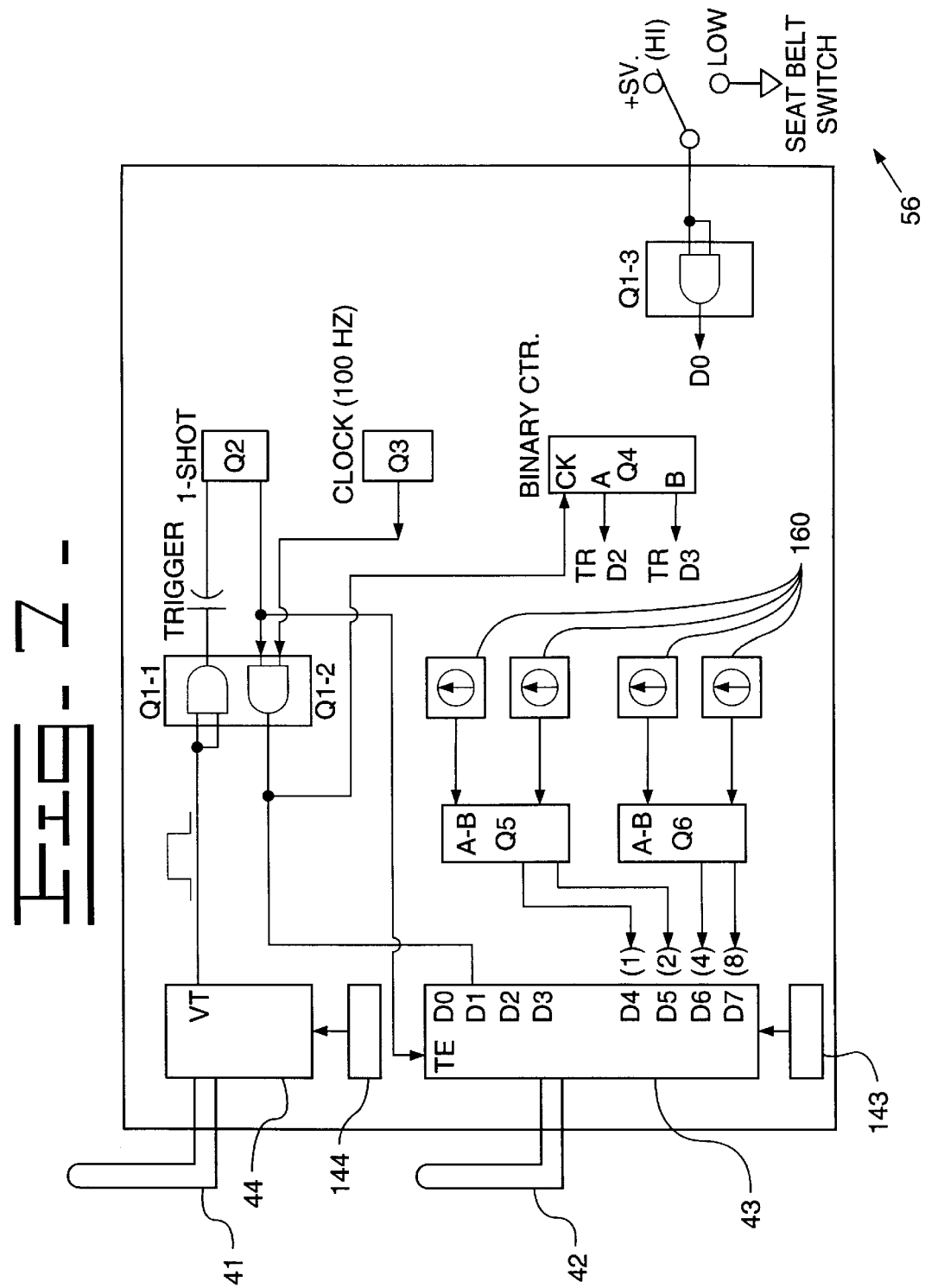
FIG. 7 is an electrical schematic of the vehicle device.

To use the enforcement device 10, the user turns "on" a power switch 32 and resets reset displays 31 to zeros or starting status via a reset 25. To detect seat belt usage or lack thereof in a vehicle having the vehicle device 11 installed therein, the user points the enforcement antenna 24 of the enforcement device 10 at the vehicle and squeezes the trigger 17. Referring now to FIG. 4, the trigger 17 activates a one-shot transmit enable Q11 producing a 100 millisecond signal to the transmitter 12, thereby activating the transmitter 12. The transmitter 12 has an identification code of (0101010101), which will only communicate with a receiver in a vehicle having the same code. The transmitter 12 transmits a signal from the enforcement antenna 24. The enforcement device 10 will receive a return signal via the enforcement antenna 38 from the vehicle device 11. The enforcement antenna 38 receives and provides the incoming signal to the receiver 13. The receiver 13 is, preferably, an eight channel (D0–D7) receiver. If the receiver 13 verifies that an incoming signal from the vehicle device 11 is from an identification code consistent with the vehicle transmitter 43 code (i.e., 1010101010), the receiver 13 will generate a verified transmission signal VT and release digital information from the eight channels (D0–D7) of the receiver 13. The digital information is transferred from the receiver 13 and buffered by Q1 and Q2, thereby not loading the receiver's 13 outputs. Inputs 1, 2, 4, and 8 of display driver/latches Q7–Q10 receive binary code information buffered by Q2. Four channels D0—belt switch status, D1—clock and arm window (1-shot) combined, D2—"A" binary sequence and D3—"B" binary sequence of digital information from the receiver 13 are buffered by Q1. Thereafter, the belt switch status D0 is directed to Q3, which decodes a "yes" or "no" and illuminates a yes lamp 30 or a no lamp 29, respectively. In an alternative embodiment, the yes lamp 30 is colored green and the no lamp 29 is colored red, such that when the seat belt is fastened, a green light is displayed and when the seat belt is not fastened, a red light is displayed. The clock and arm window D1 signal is buffered by Q1, inverted by an inverter Q4 and sent to a clock input CI of Q5. The "A" binary sequence D2 and "B" binary sequence D3 contain binary status (i.e., 00, 01, 10, 11) and are received by Q5, which produces an output decoding sequence of 1, 2, 3, 4. The decoding sequence of Q5 is controlled by an inverted VT signal. This combination activates four switches of Q6, which in sequence enables display/latches Q7–Q10. The display/latches Q7–Q10 provide output drivers for the displays 31 for displaying the last four vehicle identification numbers of the vehicle having the vehicle device 11 that was detected. The displays 31 are, preferably, two digit, seven segment displays. A display filter 33 is located between the displays 31 and user to enhance the light (e.g., red light) emitted from the Light Emitting Diodes (LED). In alternative embodiments, Liquid Crystal Display (LCDs) are substituted for the LEDs and display filter 33, which has a lower power requirement. The displays 31 are reset via the reset 25 each time the user uses the enforcement device 10.

FIGS. 5–18 show the vehicle device 11 having a vehicle circuit board 40 and vehicle antennas 41, 42. The vehicle antennas 41, 42 are, preferably, 418 mega-Hertz (MHz) antennas. Referring now to FIG. 8, the vehicle antennas 41, 42 are dual ¼ wavelength antenna elements. The vehicle antennas 41, 42 are mounted horizontally and in the direction of travel of the vehicle. The vehicle antennas 41, 42 are, preferably, mounted above a vehicle's headliner. Referring again to FIGS. 5–8, the vehicle antennas 41, 42 are operatively attached to a vehicle antenna ground plane 45. The vehicle antenna ground plane 45 provides a ground for the vehicle antennas 41, 42. The vehicle antennas 41, 42 have vehicle antenna wires 46, 47 and are connected to the vehicle ground plane 45 and via vehicle antenna connectors 48, 49, respectively. The vehicle antenna wires 46, 47 have distal ends having second vehicle connectors 52, 53 for electrically connecting the vehicle antenna wires 46, 47 to a transmitter 43 and a receiver 44, respectively, of the vehicle circuit board 40. The second vehicle connectors 52, 53 are preferably SMA connectors and mate with vehicle board connectors 50, 51, respectively. The vehicle antenna 42 is operatively, electrically connected to the transmitter 43, and the vehicle antenna 41 is operatively, electrically connected to the receiver 44. The vehicle antennas 41, 42 are used to transmit and receive signals, respectively, from the enforcement device 10.

The vehicle device 11 has a vehicle printed circuit board 40 including the transmitter 43 and the receiver 44 for transmitting and receiving a signal to and from the enforcement device 10, respectively. The transmitter 43 is preferably a Transmitter, part number TXE-418-KH sold by Linx Technologies having an office at 575 S.E. Ashley Place, Grants Pass, Oreg., 97526. The receiver 44 is preferably an eight channel data receiver, part number RXD-418-KH sold by Linx Technologies having an office at 575 S.E. Ashley Place, Grants Pass, Oreg., 97526. Voltage regulators 54, 55 are electrically connected to and recommended by the manufacturers of the transmitter 43 and the receiver 44, respectively. The voltage regulator 54 is a 5 VDC voltage regulator and is electrically connected to the transmitter 43. The voltage regulator 55 is a 3.3 VDC voltage regulator and is electrically connected to the receiver 44. The vehicle device 11 is battery powered by the vehicle's 12VDC system. The vehicle's 12 VCD is applied to the vehicle's printed circuit board 40 via terminal 140 each time the ignition switch is turned "on."

The vehicle equipped with the vehicle device 11 receives a signal from the enforcement device 10. The receiver 44 receives the signal via the vehicle antenna 41 and, if accepted as the correct code, a transmission verified VT signal is generated from the receiver 44 and buffered by buffers Q1-1. A capacitive coupled output of Q1-1 triggers a 100 millisecond pulse out of Q2. The output pulse becomes the transmit enable TE for the return path to the transmitter 43. The Q2 pulse is also combined with a 100 Hertz clock Q3 by way of the AND function of Q1-2. This signal is the input of input channel D1 of the transmitter 43. Q1-3 is a buffer for a seat belt switch 56, which produces a high signal for "yes" or a low signal for "no" seat belt connection status from the seat belt switch 56 and delivers this signal to channel D0 of the transmitter 43 for transmission to the receiver 13 of the enforcement device 10. In alternative embodiments, each seat belt has the seat belt switch 56 connected thereto and a "no" seat belt connection status is generated if one or more of the seat belt switches 56 are disconnected and a "yes" seat belt connection status is generated if all seat belt switches 56 are connected. There are a number of seat belt switches for indicating whether a seat belt is fastened that is known by those in the automotive industry. Many of these switches and circuits have an audio (i.e., a beep) or visual (i.e., a warning light) reminder to the driver. For example, U.S. Pat. Nos. 5,883,441 and 6,215,395 have seat belt switches and circuits that can be modified and used herein. The clock signal and 1-shot signal from Q1-2 provide a clocking action for binary counter Q4. Q4 generates an output code 00, 01, 10, 11 through outputs A and B to inputs A and B of Q5 and Q6, which will control multiplexers Q5 and Q6. The A and B codes also become digital inputs D2 and D3, respectively, of the transmitter 43. Q5 and Q6 receive four digits of the vehicle identification number (VIN) from four BCD code switches 160 (1, 2, 4, 8). This vehicle identification code is specific to each vehicle and is set by the manufacturer via the switches 160 or programmed in a memory device. This code is placed at the digital inputs D4, D5, D6, D7 of the transmitter 43 at regular intervals, with each digit following the previous digits. During the return path transmission to the receiver 13 of the enforcement device 10 and while the TE signal is high, all digital information including return path identification code (1010101010) transmitted to receiver 13 of the enforcement device 10 is repeated at least three times. The receive, delay and respond function of the vehicle device 11 is completed and insures that the transmitters 12 and 43 or the receivers 13 and 44 will not be on at the same time causing improper function of the system.

The technology used for and components on the enforcement circuit board 16 and the vehicle circuit board 40 are, preferably, through hole, surface mount or hybrid technology. The technology used is not meant to be limiting and is selected dependent upon the cost, production capabilities and spacing requirements.

The enforcement device 10 is described as an individual unit; however, it is important to note that the enforcement unit 10 is capable of being part of a speed radar gun. In that way, an all purpose safety enforcement device for detecting speeding and non-seat belt usage is provided. In an alternative embodiment, the enforcement unit 10 is attached to an existing radar gun by means of a holder, thereby creating a single piece of equipment.

In another embodiment, the enforcement unit 10 is placed proximate the roadway and is automatically triggered by sensors that detect the presence of a vehicle. These sensors are known to those skilled in the art and further explanation is not required.

In another embodiment, there is an apparatus and method integrating the technology for detecting red light violations with the above-mentioned invention. Surveillance cameras or videos used to issue a photo ticket are easily adapted to with aforementioned inventions to provide monitoring and detection of seat belt usage and issuance of tickets for non-seat belt usage.

The invention in its broader aspects is not limited to the specific mechanisms shown and described but departures may be made therefrom within the scope of the accompanying claims without departing from the principles of the invention and without sacrificing its chief advantages.

What is claimed is:

1. An apparatus for detecting seat belt usage, comprising:
    an enforcement device having an enforcement circuit board for sending a first signal and receiving a return signal;
    a vehicle device having a vehicle circuit board for receiving the signal from and return the return signal to the enforcement device;
    means for generating a properly fastened state or an improperly fastened state for a seat belt;
    means for synchronizing multiplexers at a vehicle transmitter;
    means for decoding the return signal at an enforcement receiver; and
    wherein the means for synchronizing multiplexers and the means for decoding are maintained in phase by transmitting a vehicle's clock and 1 shot arming window in the return signal with BCD data and binary sequence data.

2. An apparatus for momentarily detecting seat belt usage status of at least one seat belt located within a selected vehicle, comprising:

an enforcement device having at least one enforcement antenna;

an enforcement transmitter for sending a first signal;

an enforcement receiver for receiving a return signal carrying seat belt usage information;

an enforcement encoder for encoding the first signal;

the enforcement transmitter and the enforcement receiver being electrically connected to the at least one enforcement antenna;

a trigger operatively connected to the enforcement device;

a vehicle device adapted for installation in the selected vehicle, the vehicle device having a vehicle receiver for receiving the first signal from the enforcement transmitter, a vehicle transmitter for sending the return signal to the enforcement device, and a vehicle encoder for encoding the return signal, the vehicle transmitter and the vehicle receiver being electrically connected to the at least one vehicle antenna;

the vehicle device being adapted to receive seat belt usage information from a seat belt status detector;

a first power supply electrically connected to the enforcement device;

a second power supply electrically connected to the vehicle device; and a display electrically connected to the enforcement receiver.

3. The apparatus according to claim 2, wherein the enforcement device is powered by a rechargeable battery.

4. The apparatus according to claim 2, wherein the vehicle device is powered by the power supply of the vehicle.

5. The apparatus according to claim 2, wherein the enforcement device is portable.

6. The apparatus according to claim 2, wherein the enforcement device is stationary.

7. The apparatus according to claim 2, wherein the display device is selected from the group consisting of a lamp, a light emitting diode, and a liquid crystal display.

8. The apparatus according to claim 2, further comprising a reset mechanism electrically connected to the enforcement device.

9. The apparatus according to claim 2, wherein a first antenna is electrically connected to the enforcement transmitter and a second antenna is electrically connected to the enforcement receiver.

10. The apparatus according to claim 2, wherein a third antenna is electrically connected to the vehicle transmitter and a fourth antenna is electrically connected to the vehicle receiver.

11. The apparatus according to claim 2, wherein the return signal carries BCD data.

12. The apparatus according to claim 2, wherein the return signal carries binary sequence data.

13. The apparatus according to claim 2, wherein the return signal carries vehicle identification number information.

14. The apparatus according to claim 13, wherein the vehicle identification number information includes at least four digits of the vehicle's vehicle identification number.

15. The apparatus according to claim 2, wherein the first signal and the return signal are each encoded with a transmit code.

16. The apparatus according to claim 15, wherein the transmit code of the first signal is identical to the transmit code of the return signal.

17. The apparatus according to claim 2, wherein the first signal and the return signal are radio frequency modulated.

18. The apparatus according to claim 17, wherein the first signal and the return signal operate at 418 Megahertz (Mhz).

19. The apparatus according to claim 17, wherein the at least one enforcement antenna is a whip-style antenna transmitting in a substantially horizontal plane and further comprising a grounding plane electrically connected to the at least one antenna and substantially parallel to the horizontal plane.

20. An apparatus for momentarily detecting seat belt usage status of at least one seat belt located within a selected vehicle, comprising:

a portable enforcement unit having an enforcement device and a speed radar detection device, the enforcement device having a enforcement circuit board and at least one enforcement antenna;

the enforcement circuit board including an enforcement transmitter for sending a first signal, an enforcement receiver for receiving a return signal carrying seat belt usage information, and an enforcement transmit code device for encoding the first signal, the enforcement transmitter and the enforcement receiver are electrically connected to the at least one enforcement antenna;

a trigger operatively connected to the enforcement unit;

a vehicle device operatively connected to the vehicle, the vehicle device having a vehicle circuit board, the vehicle circuit board including a vehicle receiver for receiving the first signal from the enforcement transmitter, a vehicle transmitter for sending the return signal to the enforcement device, and a vehicle code device for encoding the return signal, the vehicle transmitter and the vehicle receiver are electrically connected to the at least one vehicle antenna;

a seat belt switch electrically connected to the vehicle circuit board;

a first power supply operatively connected to the enforcement unit;

a second power supply operatively connected to the vehicle device; and a display electrically connected to the enforcement receiver of the enforcement circuit board.

21. A method for momentarily detecting seat belt usage status, the steps comprising:

selecting a vehicle;

transmitting a first signal from an enforcement device having an enforcement circuit board;

receiving the first signal by a vehicle device mounted to the vehicle, the vehicle device having a vehicle circuit board;

processing the first signal with the vehicle circuit board;

determining seat belt usage status of at least one seat belt located within the vehicle, wherein said step of determining seat belt usage status occurs after said step of receiving the first signal;

creating a return signal with the vehicle circuit board;

transmitting the return signal to the enforcement circuit board of the enforcement device;

processing the return signal with the enforcement circuit board; and determining a properly fastened state or an improperly fastened state for a seat belt from the return signal.

22. The method according to claim 21, further comprising the step of displaying the seat belt usage status.

23. The method according to claim 21, further comprising the step of resetting the enforcement device.

24. The method according to claim 21, further comprising the steps of encoding the first signal at the enforcement device; and decoding the first signal at the vehicle device.

25. The method according to claim 21, further comprising the steps of encoding the return signal at the vehicle device; and decoding the return signal at the enforcement device.

26. The method according to claim 21, further comprising the step of retrieving vehicle identification number information.

27. The method according to claim 26, further comprising the step of displaying vehicle identification number information.

28. A method of assembling an apparatus for momentarily detecting seat belt usage status of at least one seat belt located within a vehicle, the method comprising the steps of:

providing an enforcement circuit board;

connecting at least one enforcement antenna to the enforcement circuit board;

connecting an enforcement transmitter for sending a first signal to the enforcement circuit board;

connecting an enforcement receiver for receiving a return signal carrying seat belt usage information to the enforcement circuit board;

connecting a trigger to the enforcement circuit board;

connecting a first power supply to the enforcement circuit board;

connecting a display to the enforcement circuit board;

providing a vehicle circuit board;

mounting the vehicle circuit board to the vehicle;

connecting a vehicle receiver to the vehicle circuit board;

connecting a vehicle transmitter to the vehicle circuit board;

connecting a seat belt switch to the vehicle circuit board; and connecting a second power supply the vehicle circuit board.

* * * * *